United States Patent [19]

De Socio et al.

[11] 4,254,156

[45] Mar. 3, 1981

[54] IMITATION CHEESE BASE

[75] Inventors: Paul De Socio, Levittown, N.Y.; Morris Kaporsvsky, Montreal, Canada; Joel S. Tropp, Valley Stream, N.Y.

[73] Assignee: Jubilee Foods, Inc., Hackensack, N.J.

[21] Appl. No.: 36,679

[22] Filed: May 7, 1979

[51] Int. Cl.³ .................. A23L 1/04; A23L 1/187; A23G 3/00

[52] U.S. Cl. .................. 426/565; 426/576; 426/578; 426/582

[58] Field of Search ............ 426/582, 576, 578, 565

[56] References Cited

U.S. PATENT DOCUMENTS

| | | | |
|---|---|---|---|
| 1,928,664 | 10/1933 | Gutgeld | 426/582 |
| 2,015,257 | 9/1935 | Clickner | 426/582 |
| 2,112,442 | 3/1938 | Libanoff | 426/582 |
| 3,455,698 | 7/1969 | Vakaleris | 426/582 |
| 3,666,493 | 5/1972 | Bluemke | 426/578 |
| 4,163,806 | 8/1979 | Callen | 426/582 |

*Primary Examiner*—Jeanette M. Hunter
*Attorney, Agent, or Firm*—Samuelson & Jacob

[57] ABSTRACT

An imitation cheese base which simulates the consistency, feel and texture of a cheese cake filling is prepared by mixing a cooled gelled custard, a solution of gelatin, a dry mix of starch and sugar and a vegetable oil-based imitation cheese to form a chilled slurry and aerating the same. The resulting mixture possesses a cellular structure which it retains for a long period of time.

10 Claims, 1 Drawing Figure

U.S. Patent    Mar. 3, 1981    4,254,156
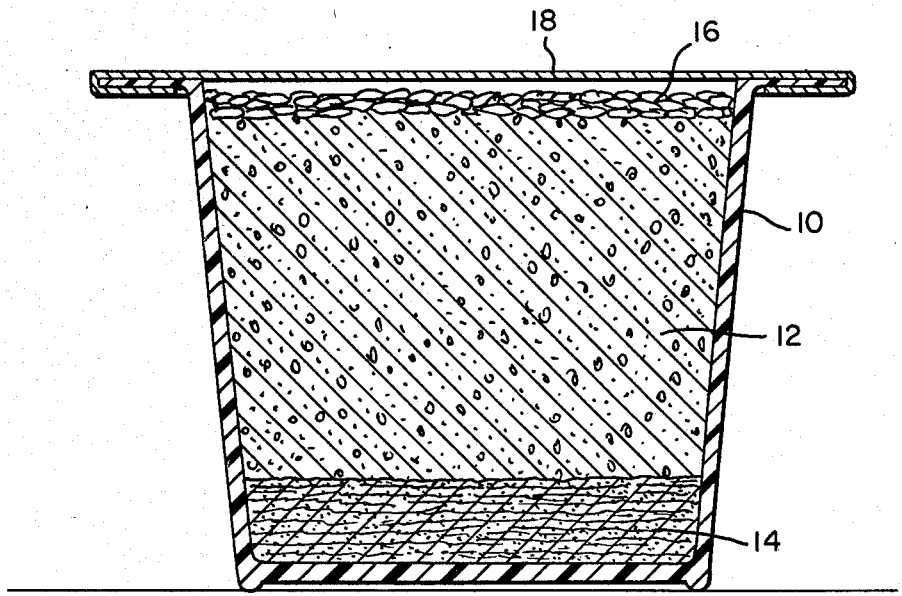

IMITATION CHEESE BASE

This invention relates to an imitation cheese base useful in the preparation of a frozen dessert or other food items. More particularly it relates to the preparation of an imitation cheese base for an imitation cheese cake dessert, and to the composition of which it consists.

One object of the invention is to provide an imitation cheese base which simulates the consistency, feel and texture of a cheese cake filling by virtue of its cellular structure and which has the ability to retain that cellular structure for a long period of time, even when held at room temperature, and for even longer periods of time when stored frozen or under refrigeration.

Another object of the invention is to provide an imitation cheese base with a cellular structure which will retain the desired consistency, feel, texture and food quality even though subjected to several cycles of freezing and thawing.

The invention will be readily understood from the description which follows including the Figure, in which a preferred embodiment of the invention is described by way of illustration and is not intended to limit the same.

The imitation cheese base of this invention is prepared by combining four separately formulated individual constituents, as follows:

CUSTARD COMPONENT

The first of the four constituents from which the imitation cheese base of this invention is prepared is formulated as follows, all parts being by weight:

To eight parts of water, ordinary granular sugar (sucrose) is added until no more sugar will disslove, usually about three parts by weight may be dissolved in the water. Then one part by weight of commercially available custard base is added to the sugar/water solution and stirred to insure thorough mixing. A specific commercially available custard base suitable for the present invention is sold by the PAV-LAB of Downers Grove, Illinois under the identification "6.782C".

The resulting mixture is heated to a temperature of between about 175° F. and 195° F., preferably about 180° F., and cooked at this temperature until the custard begins to gel, and the mixture thickens. At this point heating is discontinued and the custard is permitted to cool to about 40° F. The custard gels during the cooling step.

The resulting product is stored at a temperature of 40° F. or below until it is to be combined with the other prepared ingredients, as described below.

GELATIN COMPONENT

In 11.5 parts by weight of water, about one part by weight of gelatin (150 Bloom) is dissolved. A preservative such as potassium sorbate, may be added, about 0.1 part by weight being sufficient, but this is an optional addition and is not essential.

The resulting mixture is stirred to mix the constituents, and is then brought to a boil (212° F.) and held at that temperature until all of the gelatin has dissolved. Then the product is cooled to about room temperature 75°–80° F., i.e. just to the point where not gelatinization occurs and the product remains liquid.

This is stored at a temperature of about 68° F. until used, as described below.

DRY MIX

The third constituent in the recipe is a mixture of sugar (sucrose) and low temperature wheat starch, in the proportions of about fifteen parts by weight of sugar to one-half part by weight of starch. One starch which has been successfully is one which dissolves at relatively low temperatures and is sold by General Mills under the name "Pay-Gel 90".

A total of about nineteen parts by weight of sugar are to be used in the three constituents, so that if less sugar is added to the custard, more will be present in the dry mix, the total being 18–20 parts by weight per 100 parts by weight of total mixture.

IMITATION CREAM CHEESE

The fourth constituent in the recipe is about sixty parts by weight of commercially available cultured vegetable oil or acidified vegetable oil sold commercially as imitation cream cheese. A small amount of yellow food coloring may be added to this, but this is optional.

When it is combined with the other ingredients, the imitation cream cheese is at a temperature between about 40°–45° F.

MIXING

The cooked custard prepared as described above and at a temperature of about 40° F.; the cooked gelatin prepared as described above and at a temperature of 75° F.–80° F.; the dry mix of sugar and starch at room temperature; and the imitation cream cheese at about 40°–45° F. are introduced into a vertical high speed mixer and mixed for about thirty seconds whereby a slurry is produced having a temperature of about 50° F.

The slurry is transferred to a commercial aerating machine in which metered amounts of slurry are pumped by a positive displacement pump and beaters beat the slurry while compressed air is injected into the slurry in amounts which produce a 15–20% air cell structure, i.e. a given volume of the slurry will be reduced in weight by 15–20%.

The aerated slurry is placed in containers and frozen to retain the cell structure until the gelatin can gelatinize, since after the gelatinization has taken place the cell structure is stable even if the product is permitted to return to room temperature.

The temperatures of the several constituents furnished to the high speed mixer is important because these determine the slurry temperature and this significantly affects the manner in which the slurry aerates. If the slurry temperature is much above about 50° F., even say at room temperature (68° F.), it is difficult to aerate properly and at higher temperatures above 80° F., satisfactory aeration is usually impossible.

For this reason, the cooked custard and imitation cream cheese are stored under refrigeration prior to mixing so that the slurry produced is at the correct desired temperature for aeration.

The single FIGURE illustrates one manner in which the imitation cheese base is used to make an imitation cheese cake dessert.

A cup 10 was provided with a layer of crushed graham crackers to form a bottom crust 14. Then the cup 10 was almost completely filled with aerated imitation cheese base 12 prepared as described above and then a fruit topping 16 was dispensed onto the imitation cheese base 12. The resulting dessert may be covered with metal foil 18, sealed to the rim of the cup in any conventional manner. After freezing, the dessert may be stored for as long as sixty days under ordinary refrigeration without losing its aerated structure or its flavor. In fact, the desired aerated cell structure will be retained even at room temperature for up to several days, long after the product becomes inedible due to spoilage.

Having now described the invention and a preferred embodiment thereof it is not intended that it be limited except as may be required by the appended claims.

The embodiments of the invention in which an exclusive property or privilege is claimed are defined as follows:

1. A process for preparing an imitation cheese base especially suited for an imitation cheese cake dessert, the process comprising:

separately preparing the following components:
(1) a custard component by mixing a custard base and a solution of sugar in water and cooking the same until the resulting mixture begins to gel and then permitting the mixture to cool;
(2) a gelatin component by boiling a mixture of water and gelatine until all of the gelatine has dissolved and then cooling the product to about room temperature;
(3) a dry mixture of sugar and starch by mixing the same together;
(4) an imitation cream cheese component by cooling a commercially available vegetable oil sold as imitation cream cheese to 40°–45° F.;

mixing the several said components in a mixer to obtain a slurry product at a temperature of between about 45° and 50° F.;

aerating the slurry to obtain at 15% to 20% air cell structure; and freezing the slurry in containers suitable for storage thereof, for a time at least sufficient for the gelatin therein to gelatinize.

2. The process of claim 1 which includes cooking the custard component at about 180°–190° F. until the component starts to gel, and then cooling the cooked product to about 40° F.

3. The process of claim 1 which includes cooking the gelatin component at about 212° F. until all of the gelatin dissolves and then cooling the product to about room temperature.

4. The process of claim 1 wherein the custard component comprises water, sugar and custard base in the approximate proportions of about 8:3:1 by weight.

5. The process of claim 1 wherein the gelatin component comprises water and gelatin in the approximate proportions of 11:5:1 by weight.

6. The process of claim 1 wherein the dry mix consists of sugar and low temperature starch in the proportions of about 30:1 by weight.

7. The process of claim 1 wherein the temperature of the components added to the mixer is about 40° F. for (1), 75°–80° F. for (2), room temperature for (3) and 40°–45° F. for (4).

8. The process of preparing a frozen dessert which includes preparing the imitation cheese base of claim 1, partially filling a container with the same, adding cheese cake components to the material in the container and then freezing the container with the imitation cheese base and the cheese cake components therein.

9. The frozen dessert product of the process of claim 8.

10. The imitation cheese base product of the process of claim 1.

* * * * *